United States Patent
Ning et al.

(10) Patent No.: US 10,040,704 B2
(45) Date of Patent: Aug. 7, 2018

(54) WATER TREATMENT ASSEMBLY INCLUDING HYPERFILTRATION MODULE AND CATION EXCHANGE RESIN

(71) Applicant: DOW GLOBAL TECHNOLOGIES LLC, Midland, MI (US)

(72) Inventors: Jia Ning, Shanghai (CN); Steven D. Jons, Eden Prairie, MN (US); Michael S. Koreltz, Bloomington, MN (US)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 15/512,421

(22) PCT Filed: Oct. 29, 2014

(86) PCT No.: PCT/CN2014/089766
§ 371 (c)(1),
(2) Date: Mar. 17, 2017

(87) PCT Pub. No.: WO2016/065546
PCT Pub. Date: May 6, 2016

(65) Prior Publication Data
US 2017/0247266 A1    Aug. 31, 2017

(51) Int. Cl.
*C02F 1/44* (2006.01)
*C02F 1/00* (2006.01)
(Continued)

(52) U.S. Cl.
CPC .......... *C02F 1/441* (2013.01); *B01D 61/025* (2013.01); *B01D 61/04* (2013.01); *B01D 61/12* (2013.01);
(Continued)

(58) Field of Classification Search
CPC ........ B01D 2311/04; B01D 2311/2623; B01D 2321/04; B01D 61/025; B01D 61/04;
(Continued)

(56) References Cited

U.S. PATENT DOCUMENTS

| 3,156,644 A | 11/1964 | Kunin |
| 3,492,159 A | 1/1970 | Nowlin |

(Continued)

FOREIGN PATENT DOCUMENTS

| CN | 2277985 Y | 4/1998 |
| CN | 2839254 Y | 11/2006 |

(Continued)

*Primary Examiner* — John Kim
(74) *Attorney, Agent, or Firm* — Edward W. Black

(57) ABSTRACT

A water treatment assembly (10) and method for its operation, comprising a spiral wound hyperfiltration membrane module (12) connected to: i) a feed line (14) adapted for connection to a source of pressurized feed water, ii) a permeate line (16) adapted for connection to a dispenser of treated water and iii) a concentrate line (18) adapted for connection with a drain; wherein the assembly includes a pressurizable reservoir (22) containing weak acid cation exchange resin (25) and further includes at least one valve for selectively diverting flow of pressurized feed water along the feed line (14), through the reservoir (22) and returning to the feed line (14) prior to passing through the hyperfiltration membrane module (12).

4 Claims, 2 Drawing Sheets

(51) Int. Cl.
*C02F 1/42* (2006.01)
*B01D 61/02* (2006.01)
*B01D 61/04* (2006.01)
*B01D 61/12* (2006.01)
*B01D 63/02* (2006.01)
*B01D 65/02* (2006.01)
*B01D 63/10* (2006.01)

(52) U.S. Cl.
CPC ............ *B01D 63/10* (2013.01); *B01D 65/02* (2013.01); *C02F 1/008* (2013.01); *C02F 1/42* (2013.01); *B01D 2311/04* (2013.01); *B01D 2311/2623* (2013.01); *B01D 2321/04* (2013.01); *C02F 2001/425* (2013.01)

(58) Field of Classification Search
CPC ........ B01D 61/12; B01D 63/10; B01D 65/02; C02F 1/008; C02F 1/42; C02F 1/441; C02F 2001/425
See application file for complete search history.

(56) References Cited

U.S. PATENT DOCUMENTS

| | | | |
|---|---|---|---|
| 4,595,498 A | 6/1986 | Cohen et al. |
| 4,650,586 A | 3/1987 | Ellis, III |
| 4,711,723 A | 12/1987 | Bray |
| 4,713,175 A | 12/1987 | Bray |
| 4,842,724 A | 6/1989 | Bray et al. |
| 4,861,487 A | 8/1989 | Fulk, Jr. |
| 5,296,148 A | 3/1994 | Colangelo et al. |
| 5,501,798 A | 3/1996 | Al-Samadi et al. |
| 5,876,602 A | 3/1999 | Jons et al. |
| 5,925,255 A | 7/1999 | Mukhopadhyay |
| 6,074,551 A | 6/2000 | Jones et al. |
| 6,171,497 B1 | 1/2001 | Hirose et al. |
| 6,461,514 B1 | 10/2002 | Al-Samadi |
| 6,881,336 B2 | 4/2005 | Johnson |
| 7,267,769 B2 | 9/2007 | Baird |
| 7,459,082 B2 | 12/2008 | Tung et al. |
| 7,459,088 B2 | 12/2008 | Davis |
| 8,137,539 B2 | 3/2012 | Gilron et al. |
| 8,142,588 B2 | 3/2012 | McCollam |
| 8,323,484 B2 | 12/2012 | Kung et al. |
| 8,337,698 B2 | 12/2012 | Hou |
| 8,361,318 B2 | 1/2013 | Chikura et al. |
| 8,496,825 B2 | 7/2013 | Jons et al. |
| 8,679,347 B2 | 3/2014 | Al-Samadi |
| 8,845,888 B2 | 9/2014 | Manabe et al. |
| 2004/0222158 A1 | 11/2004 | Husain et al. |
| 2011/0163016 A1 | 7/2011 | Saveliev et al. |

FOREIGN PATENT DOCUMENTS

| | | |
|---|---|---|
| CN | 102897943 | 1/2013 |
| CN | 202829750 | 3/2013 |
| CN | 103068472 | 4/2013 |
| WO | 2007018561 | 2/2007 |
| WO | 2013015971 | 1/2013 |

WATER TREATMENT ASSEMBLY INCLUDING HYPERFILTRATION MODULE AND CATION EXCHANGE RESIN

FIELD

The invention is directed toward water treatment assemblies including both a hyperfiltration membrane module and a pressurizable reservoir containing a weak acid cation exchange resin.

INTRODUCTION

"Hyperfiltration" is a membrane-based separation process where pressure is applied to a feed solution on one side of a semi-permeable membrane. The applied pressure causes "solvent" (e.g. water) to pass through the membrane (i.e. forming a "permeate" solution) while "solutes" (e.g. salts) are unable to pass through the membrane and are concentrated in the remaining feed (i.e. forming a "concentrate" solution). To overcome the natural driving force of solvent to move from low to high concentration, the applied feed pressure must exceed the osmotic pressure. For this reason, the term "hyperfiltration" is often used interchangeable with "reverse osmosis." Most water treatment assemblies utilizing hyperfiltration operate in cross-flow mode with the majority of feed passing across the surface of the membrane and a minority portion passing through the membrane as "permeate." See for example: U.S. Pat. No. 4,711,723, U.S. Pat. No. 4,713,175, U.S. Pat. No. 4,842,724, U.S. Pat. No. 5,296,148, U.S. Pat. No. 7,267,769 and CN 2839254.

The percentage of feed solution passing through the membrane is referred to as the "recovery" or "recovery rate." Depending upon the composition of the feed, operating at higher recoveries can lead to scaling as the salts in the feed become concentrated above their solubility limit. Individual modules in large scale desalination systems are typically designed to run continuously with 10-20% recovery. Methods known to avoid scaling in such high recovery systems include: dosing anti-scalants, dosing acid to reduce pH, feed flow reversal, incorporating precipitation and filtration within a concentrate recycle loop, and softening either the feed water or a recycled concentrate. See for example: U.S. Pat. No. 6,461,514, U.S. Pat. No. 5,501,798, U.S. Pat. No. 5,925,255, U.S. Pat. No. 8,137,539 and U.S. Pat. No. 7,459,088. Softening methods to reduce divalent cations include nanofiltration, lime softening, use of a strong acid resin, electro-deionization and weak acid cation ion exchange. When used, ion-exchange resin may be regenerated using recycled salts (U.S. Pat. No. 8,679,347).

Small reverse osmosis modules used in residential systems are commonly designed for recoveries between 20-35%. Significantly higher recoveries (e.g. above 35%) are frequently limited by scaling, as most un-softened residential waters contain significant amounts of calcium and bicarbonate ions. Increasing this concentration through high recovery operation can especially result in $CaCO_3$ scale. Unlike scale-reducing techniques used in industrial water treatment assemblies, design options are more limited when designing a small, residential membrane system, where size, cost, and complexity are constrained. Active chemicals (e.g. acids and anti-scalants) are difficult for consumers to obtain and use. Alternative techniques including flushing the feed side of a membrane module with fresh feed or permeate water (U.S. Pat. No. 4,650,586, WO2007018561, US20110163016 and U.S. Pat. No. 8,323,484) and rapid recirculation (U.S. Pat. No. 6,074,551) are occasionally practiced. However, these options require additional components and can decrease the effective recovery of the system. Ion-exchange treatment of feed water is practiced prior to reverse osmosis, but this approach is limited by trade-offs between space and capacity and the difficulty in regenerating ion exchange resin.

SUMMARY

The invention includes a water treatment assembly including a spiral wound hyperfiltration membrane module connected to: i) a feed line adapted for connection to a source of pressurized feed water, ii) a permeate line adapted for connection to a dispenser of treated water and iii) a concentrate line adapted for connection with a drain. The assembly is characterized by including a pressurizable reservoir containing weak acid cation exchange resin and further including at least one valve for selectively diverting flow of pressurized feed water along the feed line through the reservoir and returning to the feed line prior to passing through the hyperfiltration membrane module. The invention also includes a method for operating the assembly. A variety of embodiments are described.

BRIEF DESCRIPTION OF THE DRAWINGS

The figures are not to scale and include idealized views to facilitate description. Where possible, like numerals have been used throughout the figures and written description to designate the same or similar features.

DETAILED DESCRIPTION

The present invention includes a spiral wound module ("element") suitable for use in reverse osmosis (RO) and nanofiltration (NF). RO membranes are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 Daltons. For purposes of this description, the term "hyperfiltration" encompasses both reverse osmosis (RO) and nanofiltration (NF).

Figure 1:
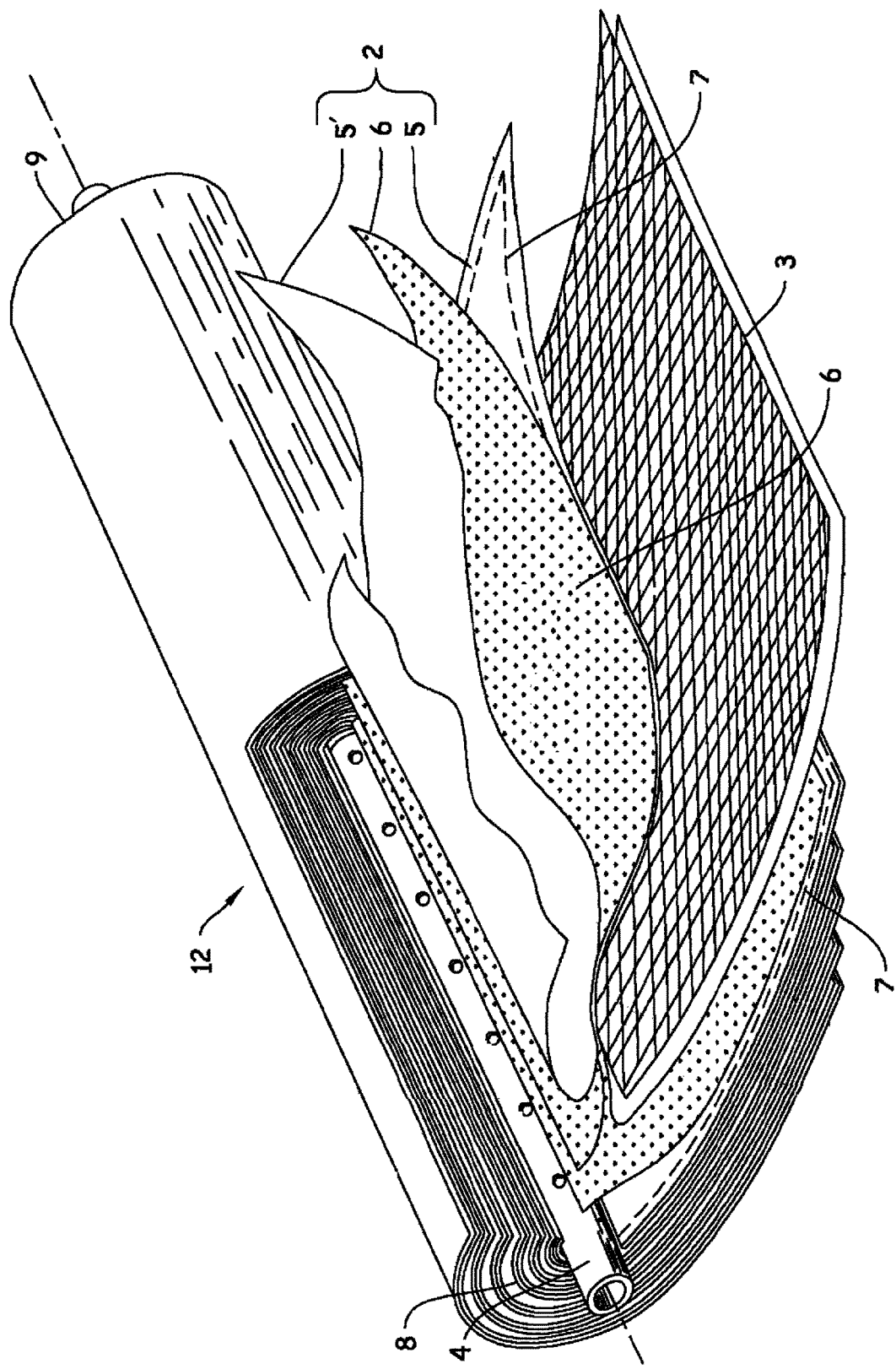
FIG. 1 is a perspective, partially cut-away view of a spiral wound module.

Spiral wound modules provide the most common configuration for hyperfiltration membranes. Their construction has been described in detail elsewhere (U.S. Pat. No. 6,881,336, U.S. Pat. No. 8,142,588 and U.S. Pat. No. 8,496,825). A representative spiral wound module (12) is illustrated in FIG. 1 and is formed by winding one or more membrane envelopes (2) and feed channel spacer sheet(s) ("feed spacers") (3) about a permeate collection tube (4). Each membrane envelope (2) preferably comprises two substantially rectangular membrane sheets (5) surrounding a permeate channel spacer sheet ("permeate spacer") (6). This sandwich-type structure is secured together, e.g. by sealant (7), along three edges to form an envelope to while the fourth edge abuts the permeate collection tube (4) so that the inside portion of the envelope is in fluid communication with a plurality of openings extending along the length of the permeate collection tube (4). The feed spacer (3) creates a free volume between membrane sheets (5) that facilitates flow of feed fluid. Typically, feed flow is in an axial direction (i.e. parallel with the permeate collection tube (4)) through the module (12), from an upstream entrance (8) to a downstream exit (9). Spiral wound modules with different flow feed flow patterns (e.g. US20040222158, U.S. Pat. No. 8,337,698) than in FIG. 1 can have different locations for an upstream entrance (8) and/or a downstream exit (9).

This invention is particularly suitable to water treatment assemblies designed for residential use, e.g. those having less than 2 m$^2$ and more preferably less 1 m$^2$ of membrane area. A preferred length for such modules is less than 0.5 m. A representative hyperfiltration module includes a FilmTec™ 1812 configuration (e.g. TW30-1812), which is nominally 1.8 inches (4.6 cm) in diameter and nominally 12 inches (30 cm) long.

Figure 2:
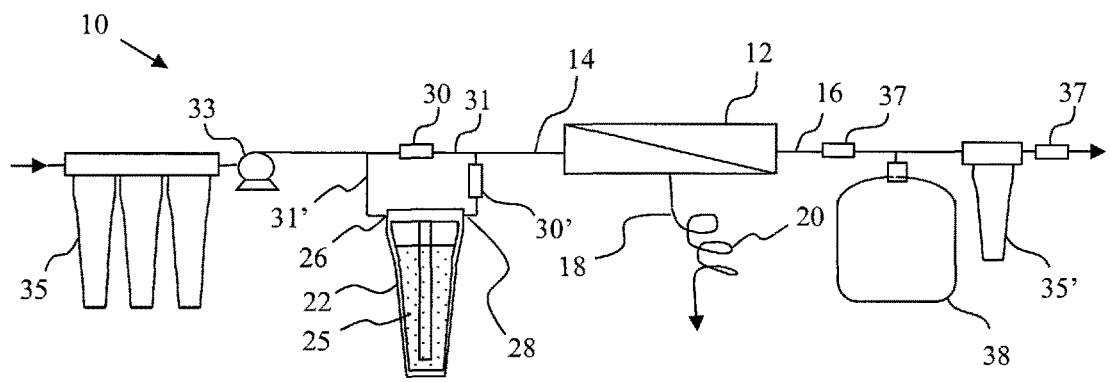
FIG. 2 is a schematic of one embodiment of the invention.
Figure 3:
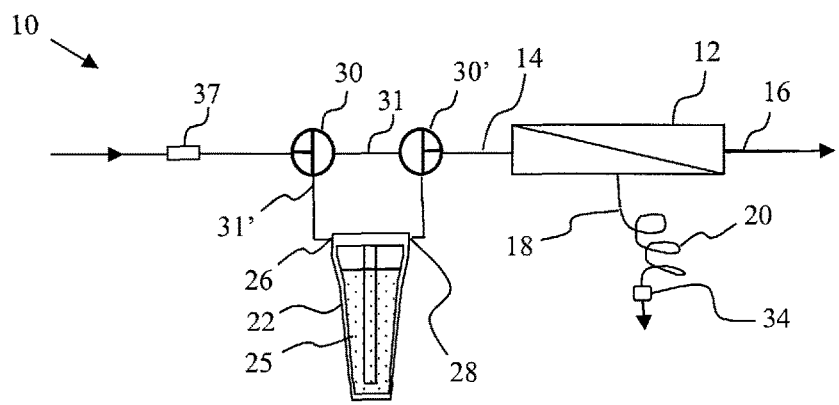
FIG. 3 is a schematic of another embodiment with two valves oriented to operate in a flushing mode.
Figure 4:
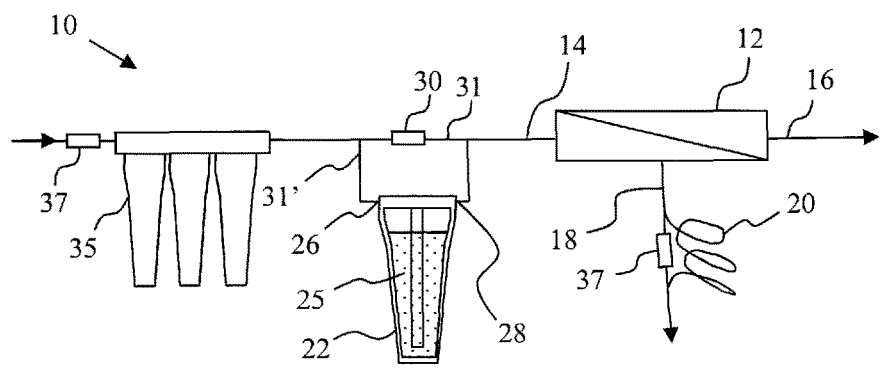
FIG. 4 is a schematic of an embodiment with a single valve to divert flow of pressurized feed water through the pressurized reservoir.

FIGS. 2, 3, and 4 schematically illustrate various embodiments of the invention. The water treatment assembly (10) includes a spiral wound hyperfiltration membrane module (12) connected to a feed line (14) adapted for connection to a source of pressurized feed water (not shown). The source of feed water is not particularly limited and includes municipal or home drinking water supplies preferably provided at a pressure greater than 10 psi, and more preferably greater than 20 psi. (In many applications, feed pressure is preferably less than 100 psi or less than 60 psi.) The module (12) is also connected to a permeate line (16) adapted for connection to a dispenser of treated water (e.g. faucet, not shown), and a concentrate line (18) adapted for connection with a drain or disposal storage vessel. The lines (14, 16, 18) may comprise traditional piping or hosing (e.g. copper, polyethylene, PVC, etc.) with connectors as conventionally used for such applications, e.g. as commonly used in residential home RO treatment systems. Alternative materials may be required for systems designed for operating under higher pressures. The spiral wound module (12) may be encapsulated within a shell or fitted within a housing with fluid inlets and outlet for connection with lines (14, 16, 18) as is common in the art. While only a single module (12) is required, multiple modules may be serially linked within a common housing or pressure vessel as is common in the art. In a preferred embodiment, an assembly (10) includes only a single spiral wound module (12).

In a preferred set of embodiments, the assembly (10) is suitable to provide more than 40% recovery. Towards this end, the concentrate line (18) may include a flow restrictor (20) that limits feed flow and preferably the flow restrictor (20) and module (12) are selected to provide a recovery greater than 40% when the module (12) is operated at 20 gfd with 500 ppm NaHCO$_3$, at 25° C. and pH 8. In some embodiments, the flow restrictor (20) and module (12) may be selected to provide more than 50%, 60%, or even 70% recovery when the module (12) is operated at 20 gfd with 500 ppm NaHCO$_3$ at 25° C. and a pH 8. In such high recovery operations with more typical waters (e.g. containing calcium and bicarbonate ions), scale formation in the flow restrictor (20) has potential to cause unstable operation. Thus in preferred embodiments, the restrictor may be a tube of at least 0.5 m, preferably at least 1 m, in length having a minimum diameter of at least 1 mm.

The assembly (10) further includes a pressurizable reservoir (22) containing a weak acid cation exchange resin (25). Cation exchange resins with pKa values above 4 are considered weakly acidic and may be employed in accordance with this invention. Suitable weak acid cation (WAC) resins may include, but are not limited to: DOWEX™ MAC-3, IMAC™ HP333, Lewatit™ CNP-80, and Amberlite™ IRC-86. A food grade weak acid cation exchange resins is preferred (e.g. Amberlite™ FPC-3500). Other examples of such resins and their manufacture are described in U.S. Pat. No. 3,156,644 and U.S. Pat. No. 3,492,159. In preferred embodiments, the weak acid cation exchange resin (25) contains ionizable carboxylate groups that are predominantly in the hydrogen form. The resin may be a solid cross-linked particle (e.g. styrene-divinyl benzene cross-linked matrix in bead from). The resin may be macroreticular or gel, but gels are preferred as they include less entrained water during shipping. The reservoir (22) may be detachable by the user from the assembly (10) to assist with re-filling or replacement of resin. However, the pressurizable reservoir containing weak acid cation exchange resin is preferably irreversibly sealed from the end user, such as by creating an encapsulated or permanently sealed product with inlet (26) and outlet (28).

The reservoir (22) includes an inlet (26) and an outlet (28) for pressurized feed water. The assembly includes valves (30, 30') for selectively diverting flow of pressurized feed water along the feed line (14), to a path (31') through the reservoir (22) between the inlet (26) and outlet (28), and returning to the feed line (14) prior to passing through the hyperfiltration membrane module (12). That is, the reservoir (22) and valves (30, 30') are located upstream from the module (12). The reservoir (22) may be further connected to an optional booster pump (33) or bladder that provides additional pressure to assist in the fluid flow, but in a preferred embodiment the reservoir (22) is passive and relies entirely on the pressure of the feed liquid flowing through feed line (14) from the source of pressurized feed water. The assembly may further include optional pre-treatment (35) and post-treatment (35'), such as multi-media filters, cartridge filters, activated carbon beds, etc. In addition to valves (30, 30') for selectively directly flow to paths through (31') or around (31) the pressurizable reservoir (22) containing weak acid cation exchange resin (25), additional manual or automatic valves (37) may be used to control total feed flow and the relative amounts passing through permeate (16) and concentrate (18) lines.

FIG. 2 illustrates an embodiment with two valves (30, 30') located in separate paths (31, 31'). The first path (31) bypasses the pressurizable reservoir containing weak acid cation exchange resin, and the second path (31') passes through the pressurizable reservoir. In operation, the first valve (30) located in the first path (31) is usually open while producing permeate so that water can flow directly to the module (12). An operating condition where the majority of the feed water flow bypasses the reservoir (22) containing weak acid cation exchange resin (25) is referred to as the standard operating mode. Alternatively, the first valve (30) may be closed to direct feed flow to the second path (31') passing through the pressurized reservoir (22). An operating condition where the majority of the feed water flow passes through the pressurized reservoir (22) is referred to as a flushing mode. FIG. 2 also shows a second valve (30') within the second path (31') that is closed during permeate production and open during a flushing step, diverting feed water through the pressurizable reservoir (22). Permeate may be generated during both of the standard operating mode and the flushing mode. However, in a preferred embodiment, a valve (37) is positioned to increase the ratio of flow through the concentrate line (18) compared to the permeate line (16) during the flushing mode. More preferably, permeation is prevented during the flushing mode.

Valves (30, 30') directing flow to the first or second path (31, 31') are described as opened or closed, but these may be understood as relative positions. For instance, a small amount of liquid may pass through a closed valve. For purposes of this document, a valve in the closed position has at least 4 times the flow of a valve in the open position. Also, while not required, a valve that is "usually open" or "usually closed" can be mechanically biased towards that state, so that energy is required to maintain another position. For this purpose, a mechanically biased (e.g. spring loaded) solenoid valve is preferred. In operation, it is preferred that a valve that is usually open or usually closed would further be in that configuration at least five times longer on average while there is feed flow.

While the assembly of FIG. 2 is in standard operating mode, valve (30) is open to bypass the reservoir such that feed water flows along the feed line (14) through the first path (31). Feed flow from this first path (31) is directed to the module (12) to generate permeate and concentrate streams which exit the module via lines (16,18) respectively. When operating in flushing mode, valves (30, 30') are actuated to direct the flow of feed water through the reservoir (22) where divalent cations may be preferentially removed from the feed solution before it enters the module (12). FIG. 3 shows an alternative design with valves (30, 30') are oriented consistent with a flushing mode, where water feed passes through the second path (31') and pressurizable reservoir (22) before entering the module (12).

FIG. 4 illustrates another embodiment, wherein the second valve (30') illustrated in FIG. 2 is not present. In this case, the resistance to flow through the first path (31) is preferably less than 20%, more preferably less than 10% or less than 5%, of the resistance to flow through the second path (31'). In this way, a smaller volume of fluid will still flow through the second path (31') in standard operating mode. Closing the first valve (30) will cause a flushing mode, selectively diverting flow of pressurized feed water through the reservoir containing weak acid cation resin. With the same applied pressure, both the overall feed flow rate through and pressure in the module would be reduced by resistance through the second path (31'). For purposes of this invention, the resistance of a path includes the resistance in valves.

A process of operating the inventive assembly comprises a standard operating mode, a flushing mode, and a dormant mode, wherein the majority of pressurized feed water bypasses the reservoir during the standard operating mode, the majority of pressurized feed water passes through the reservoir during the flushing mode, and no pressurized feed water passes through the module during the dormant mode. The valves (30, 30') may be controlled by a control circuit (not shown) which may be programmed to operate the valves (30, 30') in a flushing mode based upon a variety of criteria, i.e. time of day, volume of water treated, time since last flush, pressure drop across the module, etc.

In one preferred embodiment, the assembly is operated in a permeate-producing mode at a high recovery for more than 1 minutes, or even more than 5 minutes, with feed water bypassing the pressurized reservoir (22). Then, a flushing mode is commenced by positioning valves (30, 30') to direct a flow a feed water through the pressurizable reservoir (22). In this embodiment, the flushing mode duration is preferably less than 1 minute, less than 30 seconds, less than 10 seconds, or even less than 5 seconds. After flushing the feed side of the module (12), valves are switched back and the standard operating mode is begun again. Preferably, the average time spent in the flushing mode is between 1% and 20% the time spent in the standard operating mode. Preferably, the sequence is periodic during the time of operation, based on the time since the module was last flushed. In one embodiment, the resistance of the concentrate line (18) is decreased during a part of the flush step. In a preferred embodiment, the volume of liquid within the pressurizable reservoir exceeds that passed through the module in the flushing mode.

In another embodiment, feed water is passed through the reservoir containing weak acid cation exchange resin shortly before a dormant mode, so that it is retained in the module. In this case, a feed water depleted of divalent cations is allowed to flow from the reservoir (22) to the module (12) where it is held for a period of time (e.g. several minutes to several hours during the dormant mode) prior to exiting the module (12). This may be accomplished by entering a flushing mode shortly following, or at the end of, production of permeate. Alternatively this may be accomplished by activating a flushing mode while the assembly is inactive, e.g. during the evening when drinking water consumption is in low demand. The flushing may be triggered by a time of day, the duration of time since last flushed, or in response to the time spent producing permeate. In preferred embodiments, the flushing takes place in the absence of permeation. By providing a flushing mode shortly before a dormant mode, the membrane (5) and feed spacer (3) within the module (12) may have a prolonged period of time in contact with a lower pH and calcium-depleted feed water. As compared to soaking in either fresh feed water or even permeate water, the potential to reverse deposited scale can be greater. Further, as compared to soaking in permeate water, a higher recovery is maintained.

In embodiments where the flushing mode shortly precedes a dormant mode, the system is preferably in a flushing mode for less than 2 minutes, less than 1 minute, less even than 30 seconds. In a preferred embodiment, less than one liter of feed water, even less than 200 ml of feed water, passes through the hyperfiltration module during the flushing mode. More preferably, the volume of feed water passing through the module in the flushing mode is less than 4 times, more preferably less than 2 times, the module's feed spacer free volume (the volume of liquid that may be contained on the feed side of the hyperfiltration module). It has been found that scale may also form in the flow restrictor (20) of an assembly operated at high recovery, and it is preferred that the flushing mode also provide feed solution with reduced scale potential in the flow restrictor, so that it may also soak for a prolonged period. In preferred embodiments, the dormant mode exceeds one hour.

When a flushing mode precedes the dormant mode, all of the module's feed spacer free volume can be made to contain liquid treated by the weak acid ion exchange resin, so that scale may be dissolved during the dormant mode. However, the most important region for removal of scale is near the downstream exit (9) of the module's feed spacer (3). In one embodiment, the dormant mode immediately follows the flushing mode. However, it is also possible that the two modes are separated in time by a short period when the majority of pressurized feed water bypasses the reservoir.

This can minimize resin use by enabling a plug of resin-treated water to move through the feed line and into the module. It can also be with a shorter duration flushing mode to position a plug of resin-treated water in the most problematic region of the module.

Sensors (34) may be positioned along the assembly to provide feedback to the control unit as part of a routine for actuating the valves (30, 30'). A sensor (34') in the concentrate line (18) responding to a change in ion mix may assist in identifying an appropriate amount of time for feed flow through the reservoir such that the modified feed fills the module (12) before entering a dormant mode. For instance, increased acidity (and decreased calcium ions) leaving the hyperfiltration module may be detected by increased conductivity or decreased pH in the concentrate line (18).

To use the resin capacity efficiently, it is preferred that the module has low total feed spacer free volume. Preferably the feed spacer free volume is less than 0.2, 0.15, or even less than 0.1 liter per square meter of membrane. One way this may be accomplished is by use of a thin feed spacer. Alternatively or in addition, a module with low feed spacer volume may be obtained by using a bi-directional net with increased thickness or number of strands per inch in one or both directions. Such spacers may be constructed by methods known in the art (e.g. U.S. Pat. No. 4,861,487A, U.S. Pat. No. 6,881,336, U.S. Pat. No. 7,459,082, U.S. Pat. No. 8,361,318). A high permeability (A-value) of the membrane can also contribute to limiting the amount of feed spacer area required for the desired module flow rate. Membrane used in the FILMTEC™ TW30-1812-100 module is among the highest permeability commercial reverse osmosis membranes (A-value ~0.4 gfd/psi). However, treatment of this or similar membranes with chlorine, as described in U.S. Pat. No. 5,876,602 and U.S. Pat. No. 6,171,497 can substantially increase its flow, resulting in A-values greater than 0.55 gfd/psi (13.5 L/m$^2$/hr/bar). In a preferred embodiment, the ratio of feed spacer thickness to membrane A-value is less than 60 bar sec. Unfortunately, even when lowering pressure to operate at conventional fluxes, high permeability membranes can increase scaling potential by causing uneven flow distribution into the permeate spacer, with more flux near the permeate tube. In one embodiment, the permeate spacer has greater thickness than the feed spacer, in contrast to conventional designs. For instance, a 12 mil (0.30 mm) permeate Tricot material may be used in combination with a 10 mil (0.25 mm) thick feed spacer net.

The subject assembly is particularly suited for residential applications that exclude pumps and which rely solely upon pressure of an in-line tap water source (e.g. from 10 to 60 psi). Alternatively, or additionally, the assembly may exclude any tanks (38) for storing permeate. In such applications, the assembly may be mounted under-the-sink for treating drinking water or used in connection with appliances such as ice makers and dishwashers. In other embodiments, the assembly optionally includes one or more pumps or additional treatment units, e.g. a microfiltration cartridge located upstream from the spiral wound membrane module, or a downstream UV-sterilizer.

For purposes of better understanding this invention, one may consider operation with both a strong acid resin and a weak acid cation exchange resin. In residential water treatment, feed composition may vary dramatically, and this unpredictability is one of several issues that makes system design different than for larger systems. A feed water with the initial constituents shown in Table I has been selected for discussion. It has an LSI (Langelier saturation index) of −0.106 at 22° C. and pH 7.9. Dow Chemical's ROSA (Reverse Osmosis System Analysis) software (v. 8.0) predicts that after 50% recovery, the concentrations of ions in the reject could be about twice as high and correspond to a slightly elevated pH 8.2 and an LSI of 0.764. LSI values greater than zero indicate environments favorable to scale. The capacity to treat this feed water and avoid scaling is compared for a relative high capacity strong acid cation exchange resin (Amberjet™ 1600H) and a weak acid cation exchange resin (IMAC™ HP333).

TABLE I

| Feed Constituent | mg/L | meq/L |
|---|---|---|
| Potassium (K$^+$) | 3.60 | 0.092 |
| Sodium (Na$^+$) | 67.6 | 2.94 |
| Magnesium (Mg$^{2+}$) | 12.5 | 1.03 |
| Calcium (Ca$^{2+}$) | 40.2 | 2.00 |
| Strontium (Sr$^{2+}$) | 0.261 | 0.006 |
| Carbonate (CO$_3^{2-}$) | 0.596 | 0.02 |
| Bicarbonate (HCO$_3^-$) | 104.32 | 1.71 |
| Chloride (Cl$^-$) | 117.699 | 3.32 |
| Sulfate (SO$_4^{2-}$) | 49.0 | 1.02 |

The strong acid cation exchange resin in the hydrogen form may exchange with K$^+$, Na$^+$, Mg$^{2+}$, Sr$^{2+}$, and Ca$^{2+}$, summing to a total of 3.035 meq/L. The Amberjet™ 1600H has an operating capacity of about 1.75 eq/L, so that one liter could treat (1.75*1000/3.035=288 L) of feed. By contrast, with a weak acid cation exchange resin, only Ca$^{2+}$, Ba$^{2+}$, and Sr$^{2+}$ associated with bicarbonate alkalinity (temporary hardness) are removed and replaced by H$^+$, thus lowering the effluent pH to 4-5. Only those scale-forming cations are removed that are bound to bicarbonate, and the process stops when the pH reaches approximately 4.2, where the carboxylic groups are no longer dissociated. As waters with potential to scale are those with both calcium and alkalinity, this resin type is particularly efficient for the intended use. In the case of interest, exchange with the weak acid cation resin is limited by carbonate and bicarbonate (1.72 meq/L), so that only about half of the 3.035 meq/L of divalent cations are removed. Still, both pH and scaling potential are substantially reduced, so that that the predicted LSI will be substantially negative and CaCO$_3$ may be re-dissolved. Assuming an alkalinity leakage end point of 50%, the HP333 working capacity is 2.2 eq/L, and this suggests that one liter of this resin could remove 1280 L of temporary hardness from the feed water.

Results show that weak acid cation exchange resin was suitable to treat about 4.4 times the amount of water as the strong acid cation exchange resin. For a residential hyperfiltration module that produces 10,000 L of permeate in its lifetime, 50% recovery would correspond to twice that volume (20,000 L) of feed flow. One of the two processes described involves intermittently switching between the standard operating mode and a flushing mode. For the case considered, assuming one liter of resin and no ability to regenerate, the duration of time in each of the two modes could have a ratio of about 15. Many waters will naturally have substantially more calcium, bicarbonate ion, or higher pH, and these factors can increase the rate of resin depletion. Depending on other factors in the system, the ratio could be increased further, or replacement cartridges for the weak acid cation exchange resin would allow for increased flushing over the module's lifetime.

An alternative approach to operation involves providing a short flushing mode prior to a dormant mode, so that at least a part of the module (and preferably also the flow restrictor in the concentrate line) may be filled with a treated feed solution that can help remove potential scale. If a TW30-1812-75 module is constructed with 0.3 m² of a 90% void, 0.43 mm (17 mil) thick feed spacer, the feed spacer free volume for the module is 0.116 L. Using the 1280 L treatment capacity mention previously for 1 L of HP333 resin, two module volumes of feed could be flushed through the module more than 5000 times. If the 10,000 L of permeate were spread over about 5 years, this could allow a flushing mode to be enacted every 8 hours. Moreover, with standard continuous operation, resin performance calculations typically assume a leakage end point fraction (e.g. 50%). For instance, a working capacity of 2.2 eq/L for HP333 was assumed (based on a 50% leakage end point), but the total exchange capacity is actually 3.85 eq/L. Unlike typical operation of ion exchange, the disclosed process involves prolonged contact between feed solution and resin within the reservoir prior to flushing, so depletion of scale-forming ions can actually be greater. When compared to filling the feed spacer with either fresh feed or produced permeate, this method can have more scale removal potential. Compared to using produced permeate, an equivalent flushing step has less negative impact on system recovery. The required resin capacity of the process can further be reduced by using a module with either higher water permeability membrane or reduced feed spacer volume per square meter of membrane.

Many embodiments of the invention have been described and in some instances certain embodiments, selections, ranges, constituents, or other features have been characterized as being "preferred." Such designations of "preferred" features should in no way be interpreted as an essential or critical aspect of the invention. The entire content of each of the aforementioned patents and patent applications are incorporated herein by reference.

What is claimed is:

1. A process of operating a water treatment assembly, wherein the assembly comprises:
   a spiral wound hyperfiltration membrane module comprising at least one membrane envelope and feed channel spacer sheet wound about a permeate collection tube, wherein the module is connected to:
   i) a feed line adapted for connection to a source of pressurized feed water,
   ii) a permeate line adapted for connection to a dispenser of treated water and
   iii) a concentrate line adapted for connection with a drain;
   wherein the assembly further comprises a pressurizable reservoir containing weak acid cation resin and at least one valve for selectively diverting flow of pressurized feed water along the feed line, through the reservoir and returning to the feed line prior to passing through the module; and wherein the assembly includes at least one of:
   a valve located along the permeate line adapted to increase resistance to flow, and
   a valve located along the concentrate line adapted to decrease resistance to flow;
   wherein the process comprises introducing pressurized feed water into the feed line and operating the assembly in three distinct modes comprising a standard mode, a flushing mode, and a dormant mode, wherein the majority of pressurized feed water bypasses the reservoir during the standard operating mode, the majority of pressurized feed water passes through the reservoir during the flushing mode, and no pressurized feed water passes through the module during the dormant mode, and wherein the flushing mode precedes the dormant mode such that feed water flows from the reservoir to the module and is retained within the module during the dormant mode, and during the flushing mode, at least one of the following occurs:
   a) the valve located along the permeate line is positioned to selectively increase resistance to flow and
   b) the valve located along the concentrate line is positioned to selectively decrease resistance to flow.

2. The process of claim 1, wherein the average time spent in the flushing mode is between 1% and 20% of time spent in the standard mode.

3. The process of claim 1, wherein the duration of the flushing mode is less than 1 minute.

4. The process of claim 1, wherein the hyperfiltration membrane module has a feed spacer free volume that is less than 0.2 liter per square meter of membrane.

* * * * *